United States Patent

[11] 3,577,785

[72] Inventor Lawrence Norayr Guevrekian
Kendall Park, N.J.
[21] Appl. No. 832,351
[22] Filed June 11, 1969
[45] Patented May 4, 1971
[73] Assignee Hoffman-La Roche Inc.
Nutley, N.J.

[54] TRANSDUCER CLEANING DEVICE
5 Claims, 2 Drawing Figs.
[52] U.S. Cl. ................................................... 73/398,
73/401
[51] Int. Cl. ..................................................... G01l 9/00,
G01l 7/18
[50] Field of Search .......................................... 73/398 (R),
304, 401; 219/155; 29/81 (C); 134/5

[56] References Cited
UNITED STATES PATENTS
1,854,301 4/1932 Griffin et al. ................. 134/5UX
2,219,147 10/1940 Binder et al. ................. 338/94X
2,259,260 10/1941 Matteson et al. ............. 219/155X
2,452,367 10/1948 Gangloff ....................... 134/5X
2,477,411 7/1949 King ............................. 29/81(C)
3,470,745 10/1969 Frank ........................... 73/398(R)

Primary Examiner—S. Clement Swisker
Assistant Examiner—Daniel M. Yasich
Attorneys—Samuel L. Welt, Jon S. Saxe, Bernard S. Leon and Jacob Frank ABSTRACT: A measuring instrument comprising, in a tube, a column of an electrically conductive liquid having a height which is responsive to the input parameter to be measured, an electrical circuit to transform the height of the liquid column into an electrical output value by measuring the voltage drop across the nonimmersed part of a current-carrying wire extending through the tube, and maintaining exact longterm performance of the wire by providing an application of heat thereto thereby preventing contamination of the wire which would otherwise cause nonlinearities between input and output values.

Patented May 4, 1971  3,577,785

TRANSDUCER CLEANING DEVICE

BACKGROUND OF THE INVENTION

1. Field of the invention

This invention relates broadly to measuring instruments employing a conductive liquid column and more particularly to measuring instruments in which the height of a liquid column is responsive to the parameter to be measured and where an electrical output is provided.

2. Description of the Prior Art

The present invention concerns measuring instruments such as mercury manometers or thermometers of the type containing an enclosed column of an electrically conductive liquid, the height of the column fluctuating in response to an input value to be measured (e.g. pressure, temperature, etc.), which may or may not be associated with additional mechanisms, such as an inflatable cuff used for blood pressure detection purposes. The height of the liquid column is transformed into an electrical signal for automatic measurement of the input parameter. In connection with such measuring instruments it is common to achieve an electrical representation of the height of a column of mercury from a mercury manometer by measuring the varying voltage across a current-carrying wire which extends through the manometer tube and is partially immersed in the mercury. With manometer instruments of this type, an electrical pressure indication can be achieved with fairly good linearity.

It has been found however, that all known measuring instruments of this or similar types are not suitable for longterm operation for the reason that as these instruments are operated over an extended period of time, the linear relationship between input and output values deteriorates as a consequence of contamination of the wire. This effect renders measuring instruments as described above virtually useless for longterm operation.

SUMMARY

The purpose of the present invention is to provide a measuring instrument of the type described above, which is adapted to maintain linear longterm operation. The foregoing is achieved by providing in such a measuring instrument means for removing contaminants from the wire to maintain the linear relationship between input and output values by periodically heating the resistance wire.

BRIEF DESCRIPTION OF THE DRAWING

Other objects, advantages and capabilities of the present invention will become apparent from the following detailed description taken in conjunction with the accompanying drawing showing only a preferred embodiment.

In the drawing.

DESCRIPTION OF THE PREFERRED EMBODIMENT

Figure 1:
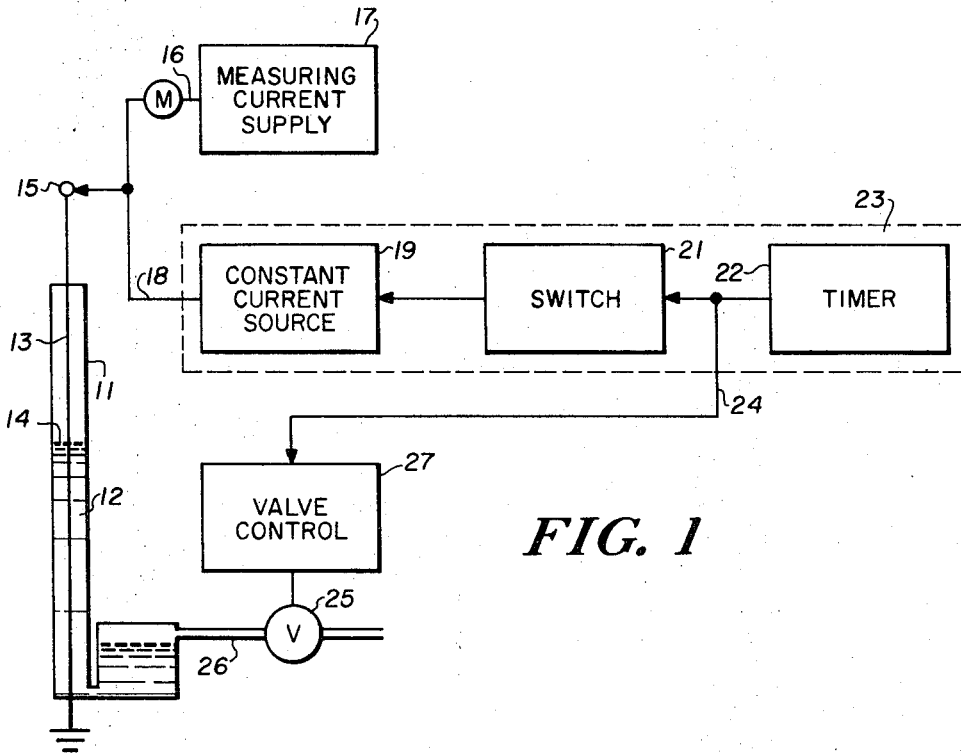
FIG. 1 is a diagrammatic sectional view of the measuring instrument of the present invention in association with an electrical block diagram representative of the circuitry utilized therewith.

Referring to the drawing, there is shown in FIG. 1 a cross section of a mercury manometer 11 containing a column of mercury 12 adapted for response to air pressure. A resistance wire 13 of a platinum-tungsten alloy or other suitable conductive material extends vertically through the manometer tube 11, and is shown in FIG. 1 to be partially immersed in the mercury 12. The upper terminal 15 of the resistance wire 13 is connected through a meter M to the output level 16 of a measuring current supply unit 17 and to the output lead 18 of a cleaning current supply unit 23, and the lower terminal of the resistance wire 13 is grounded.

The cleaning current supply unit 23 is shown to comprise of a constant current source 19 and a switch 21 which serves to terminate the operation of the constant current source as determined by a timing device 22.

The pressure-feeding line 26 includes a valve 25 adapted to apply air pressure to the manometer or to disconnect and to release the pressure from the manometer. Valve 25 is associated with valve control circuit 27 which is connected from output lead 24 of timer 22.

Figure 2:
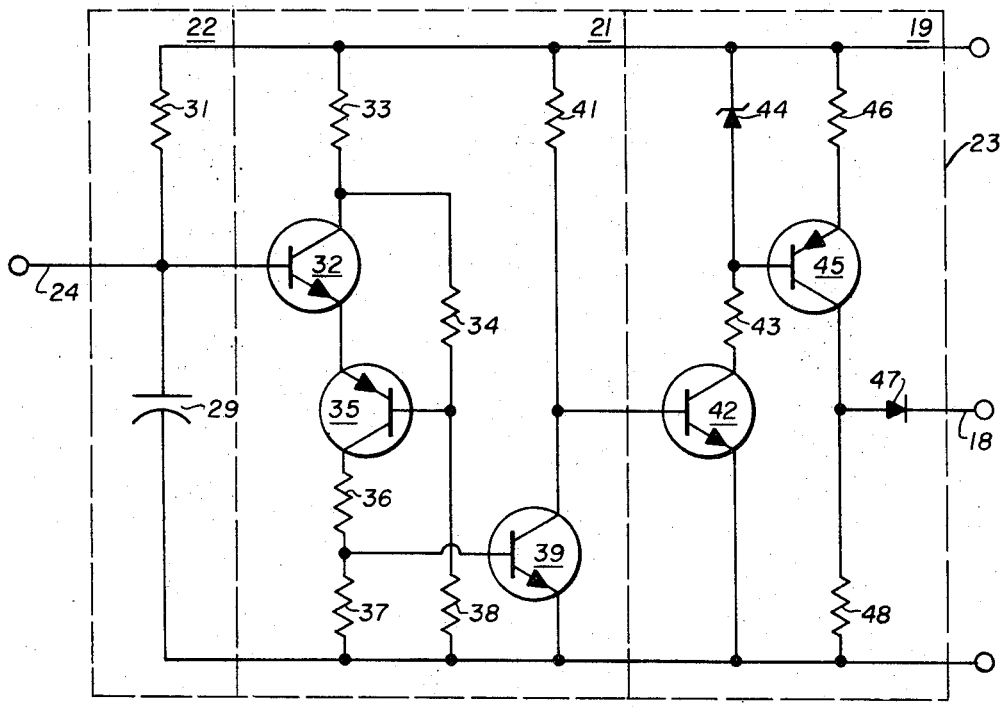
FIG. 2 shows a schematic circuit diagram of the cleaning current supply unit in FIG. 1.

With reference to FIG. 2, there is depicted one form of an embodiment in which the cleaning current supply unit 23 may take form, wherein the timing device 22 includes an RC circuit where a capacitor 29 has its negative side grounded and its negative side grounded and its positive side connected through one path by way of resistor 31 to a relatively positive voltage terminal and through a second path to the base of NPN-type transistor 32. The positive side of capacitor 29 forming the output 24 of timing device 22 is at the same time adapted for connection with valve control circuit 27. The collector of transistor 32 is connected through one path by way of resistor 33 to the positive voltage terminal and through a second path via resistor 34 to the base of a PNP-type transistor 35. The emitter of transistor 32 is directly connected to the emitter of transistor 35, the collector of which is connected through series-connected resistors 36 and 37 to ground. The base of transistor 35 is grounded by way of resistor 38.

The point intermediate resistors 36 and 37 is connected to the base of NPN-type transistor 39, having a directly grounded emitter and a collector tied through a first path including resistor 41 to the positive terminal, and through a second path serving as the output of switch 21 to the base of an NPN-type transistor 42. The emitter of transistor 42 is directly grounded whereas its collector, is connected through a resistor 43 to the base of PNP-type transistor 45 and to a Zener diode 44 which is connected in forward direction between the base of transistor 45 and the positive terminal. The emitter of transistor 45 is connected through resistor 46 to the positive terminal, whereas its collector is connected by a first path through a forward directed diode 47 to the output lead 18 of a cleaning current supply unit 23, and by a second path through resistor 48 to ground.

OPERATION

In conventional periodic utilization of a measuring instrument of the type described herein, it has been experienced, that to keep the resistance wire virtually free of contamination for maintaining accurate operation, it is sufficient to perform the cleaning process at least once per day. It is, therefore, convenient to clean the wire before every initiation of a new work shift which may occur, for example, once every 8 hours. Thus, when the measuring instrument to which the manometer is connected is turned on or set into an operating condition at the start of a new shift, the cleaning cycle is automatically initiated whereby the predetermined period defining the duration of the cleaning cycle is regulated by the timing device 22.

Prior to every cleaning operation the mercury column has to be on its lowest level so that practically the entire length of wire 13 is subjected to cleaning current. This condition is assured by the operation of valve control unit 27 in association with valve 25, which provides for releasing of the air pressure at the end of a preceding working shift. When power is applied to the overall system at the start of a new shift the timer connection insures that the valve remains, for a predetermined period, in the position which prevents the air pressure from entering the manometer whereby the mercury column stays at its lowest level.

With the application of power the cleaning constant current source is in an operating condition and cleaning current is applied to the manometer resistance wire 13. The voltage on capacitor 29 is initially low and builds up at a rate determined by the RC time constant of capacitor 29 and resistor 31. When the charge on capacitor 29 reaches a critical value, determined by the switch circuitry 21, transistor 32 and 35 turn on raising the base voltage of transistor 39. Transistor 39 turns on and switches transistor 42 off thus ending the cleaning current period which may last for about 5—10 seconds. At the same time when the critical value on capacitor 29 is reached, valve control unit 27 switches valve 25 to its normal operating condition.

With the cleaning constant current source 19 off, the only current passing through the resistance wire is that from measuring current supply unit 17 which provides a low current level to develop the required voltage readout. The readout voltage at point 15 is linearly related to the height of mercury and has a value as follows:

$$V_{out} = (l-h) R I_m$$

Where $V_{out}$ = Value of readout voltage in volts.
$l$ = Length of resistance wire.
$h$ = Height of mercury column.
$R$ = Resistance of wire per unit length.
$I_m$ = Measuring current from unit 17.

A suitable example of resistance wire characteristics of the present embodiment might, for example, include an overall resistance of approximately 40Ω. A typical current flowing through the wire during the cleaning operation might be approximately 0.6 amps, and, if flowing for 5 to 10 seconds, would heat the wire up to approximately 700° F. It is to be noted that the temperature used should be well below the temperature which would cause changes in the wire alloy but be sufficiently high to remove contaminants from the wire. One of the most undesirable contaminants in the wire employed in the present embodiment appears to be mercuric sulfate $HgSO_4$.

It should be understood, of course, that the foregoing disclosure relates to only one preferred embodiment of the invention and that numerous modifications are possible without departure from the principle and the scope of the invention. In particular the above-noted feature of cleaning the wire at every start of operation is only preferred for the reason of convenience. If a continuous longterm operation is considered, the invention may be readily modified to enable the timing device to automatically or manually provide periodic predetermined times for initiating the cleaning process. Another variation could be embodied by combining both current supplies into a single unit which is variable or switchable between one current level for cleaning and another for measuring purposes.

I claim:

1. A measuring instrument of the type containing in a tube a column of an electrically conductive liquid, measuring means energizable for transforming the height of the column into an electrical value, said measuring means including a resistance wire extending through the tube and a first current supply means having a first current value to feed an electrical current to said resistance wire, and characterized by a second current supply means connected with said resistance wire and periodically energizable to supply a second current value which exceeds said first current value for removing undesirable contaminants from the wire surface by application of heat.

2. A measuring instrument of the type containing in a tube a column of an electrically conductive liquid, measuring means energizable for transforming the height of the column into an electrical value, said measuring means including a resistance wire extending through the tube and current supply means to feed an electrical current to said resistance wire, and characterized by means for removing contaminants from the wire surface by application of heat wherein said means for removing contaminants comprises cleaning current supply means operable to deliver sufficient current for cleaning said wire and associated means ensuring that the liquid column is at its lowest level during the operation of said cleaning current.

3. A measuring instrument according to claim 2 in which said cleaning current supply means includes timer means to control the duration of the application of said cleaning current to remove contaminants.

4. A measuring instrument according to claim 3 including means connected with said cleaning current supply means to set said cleaning current supply means into operation every time the measuring instrument is energized to perform its measuring function.

5. A measuring instrument according to claim 2 wherein the height of said electrically conductive liquid is responsive to fluid pressure means and where said associated means comprises valve means actuable for freeing said conductive liquid from said fluid pressure means to maintain the conductive liquid at a low level, and timer means for actuating said valve means for a period at least coextensive with that of the operation of said cleaning current.